Feb. 16, 1960     H. J. LEMMENS ET AL     2,925,514

THERMIONIC CATHODE

Filed April 8, 1953

INVENTOR
Hendrikus Johannes Lemmens
Marinus Jacobus Jansen.
Pieter Willem Haaijman
Wilhelmus Franciscus Knippenberg
Petrus Cornelis van der Linden

BY

AGENT

United States Patent Office 2,925,514
Patented Feb. 16, 1960

2,925,514

THERMIONIC CATHODE

Hendrikus Johannes Lemmens, Marinus Jacobus Jansen, Pieter Willem Haayman, Wilhelmus Franciscus Knippenberg, and Petrus Cornelis van der Linden, Eindhoven, Netherlands, assignors, by mesne assignments, to North American Philips Company, Inc., New York, N.Y., a corporation of Delaware Application April 8, 1953, Serial No. 347,512

Claims priority, application Netherlands April 9, 1952

13 Claims. (Cl 313—346)

This invention relates to a thermionic cathode and in particular to a cathode containing a supply of alkaline earth compounds separated from an electron emissive surface of the cathode by a porous wall.

A cathode of the type which contains a supply of alkaline earth compounds separated from an electron emissive surface by a porous wall has been described in U.S. Patent 2,543,728, issued Feb. 27, 1951, to H. J. Lemmens et al. The cathode described in the patent comprises a structure forming an internal cavity in which is disposed a supply of alkaline earth compounds. The structure is made of refractory metal such as tungsten, molybdenum, tantalum, niobium and hafnium and has a porous wall, the pores of which constitute the largest passageways connecting the cavity to the outside of the cathode. The alkaline earth compounds disclosed are barium and strontium carbonates which during activation of the cathode breakdown and form the alkaline earth oxides. The latter serve as a source of alkaline earth metal which is supplied to the outer surface of the porous wall portion as a layer approximately one molecule in thickness.

A principal object of the present invention is to shorten the activation time of a thermionic cathode of the aforesaid type.

A further object of the invention is the avoidance and prevention of deleterious side-reactions between the alkaline earth compounds in the cavity and the refractory metal during activation caused by the release of gaseous products which tend to oxidize the refractory metal.

A still further object of the present invention is the rapid attainment of a high level of emission during a short activation period with a substantially reduced amount of gas being freed by the decomposition of the alkaline earth compounds in the cavity.

These and further objects of the invention will appear as the specification progresses.

In accordance with the invention, there is provided in the internal cavity of a cathode of the aforesaid type a supply of alkaline earth compounds consisting of alkaline earth oxides together with acid forming oxides such as beryllium oxide, zirconium oxide, titanium oxide, silicon dioxide, aluminum oxide, and zinc oxide, the alkaline earth oxides being in amounts not exceeding those required to form definite chemical compounds with the acid-forming oxides. In addition there are small quantities of a non-oxidic constituent disposed in reactive relationship with the oxidic compound. Such non-oxidic constituents, for example boron, boron-carbide, carbon, silicon carbide, a metal carbide or a metal boride are capable of reacting with the oxidic compound to produce free alkaline earth metal without evolving substantial quantities of gas or without deleteriously reacting with the refractory metal. The non-oxidic addition is preferably provided in the form of loose coarse grains in the mass of oxide compounds. However, if desired, the oxide compounds may be intimately mixed with the non-oxidic constituent in the cavity.

The manner in which the non-oxidic additive and the oxidic compounds are mixed for the purpose of the reaction yielding free alkaline earth metal depends on the combination of non-oxidic additive and oxidic compounds employed. For example, if the non-oxidic additive consists of boron or a metal boride, a supply of that material may be disposed in a cavity located below the cavity containing the supply of oxidic compounds and separated therefrom by a porous wall of refractory metal.

It is preferable, if the non-oxidic additive is provided separately, that is not mixed, in the same cavity or in a separate cavity, to prepare the oxides in such manner that the mass is granular. Moreover, the compound of alkaline earth oxides and acid-forming oxides must not melt when the cathode is fabricated and activated, nor must it give off gaseous products which deleteriously react with the refractory metal thereby preventing the release of free alkaline earth metal.

An excess of free alkaline earth oxide over that amount required to form a definite compound with the acid-forming oxide will also react with refractory metal of the porous wall portion to produce free alkaline earth metal which is supplied to the exterior surface of the wall.

The invention will be described in connection with the accompanying drawing and the following examples. In the drawing.

Figures 1, 2:
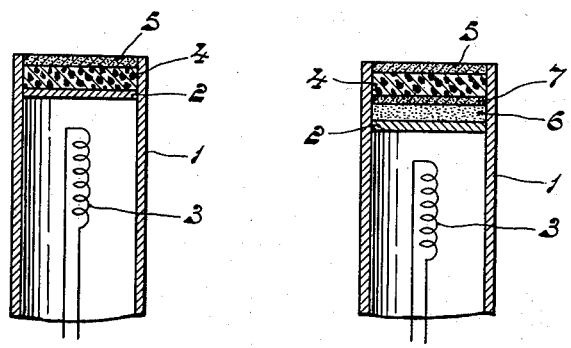
Fig. 1 is a sectional view of a cathode according to the invention in which the oxidic compounds and non-oxidic additive is contained within one cavity.
Fig. 2 is a sectional view of a cathode according to the invention in which the non-oxidic additive is contained in a cavity separated from a cavity containing the oxidic compounds by a porous wall of refractory metal.

The cathode shown in section in Fig. 1 comprises a tubular sleeve 1 of refractory metal such as molybdenum having a transverse partition 2 enclosing a heater 3 and defining a cavity in which is disposed a supply of alkaline earth compounds 4 consisting of alkaline earth compounds in amounts forming with acid-forming oxides there present definite chemical compounds. Interspersed throughout the mass of oxidic compounds or added in the form of a few grains is a non-oxidic additive capable of reacting with the oxidic compounds in a manner productive of the free alkaline earth metal. The cavity is tightly closed by a transverse end wall 5 of porous refractory metal such as sintered tungsten.

In the alternative embodiment of the cathode shown in section in Fig. 2, the non-oxidic additive 6 is disposed in a cavity below the cavity in which oxidic compounds are disposed and separated therefrom by a transverse wall 7 of porous refractory metal such as tungsten.

A cathode was made employing barium berylliate composed of 1 part of BaO and 3 to 4 parts of BeO to which was added ¼ mg. of boron. The cathode gave satisfactory emission and low evaporation of alkaline earth metal. Evaporation of alkaline earth metal was smaller than when the boron was omitted. In addition, the other objects of the invention were attained.

Instead of barium berylliate, a barium zincate composed of 1 part of barium oxide and 1 to 2 parts of zinc oxide was also prepared and good results obtained therewith. However, larger proportions of zinc oxide should be avoided because of the evaporation of zinc during operation of the cathode.

Similar cathodes were made using instead of barium berylliate, barium aluminate, barium titanate, barium zirconate, and barium silicate with boron as the non-oxidic additive. All cathodes operated satisfactorily.

The following table indicates the results obtained with cathodes employing barium berylliate and the following metal borides.

All cathodes were operated at 1050° to 1100° C. Normally, operating temperatures are lower so that cathode life is longer and evaporation of metal is reduced.

| Boride | Remarks |
| --- | --- |
| $TiB_2$ | Initially high emission levelling off to a constant value. |
| $UB_4$ | Satisfactory emission. |
| $MnB_2$ | Do. |
| $MgB_2$ | Satisfactory emission but high evaporation rate of magnesium. Most useful at low temperature operation. |
| $BaB_6$ | Satisfactory emission but high evaporation rate of barium probably from barium boride. Most useful at low temperature operation. |
| $CeB_6$ | Very satisfactory. |
| $AlB_{12}$ | Very good emission. |
| $Cr_3B_2$ | Good emission. |
| $ThB_6$ | Do. |
| $SrB_6$ | Do. |
| $Zr_3B_4$ | Initially high emission which drops to a substantially constant value. |
| $LaB_6$ | Good emission. |
| $B_4C$ | High emission and long life. |

A cathode employing 2 mg. barium berylliate and 0.3 carbon powder gave good emission. The emission, however, drops comparatively rapidly, the evaporation of barium, however, being very small.

Silicon carbide yields good emission and a slight evaporation of barium.

The metal carbides of titanium, calcium, lanthanum, tungsten, tantalum, nickel, manganese, thorium, and chromium yielded good results.

While the invention has been described in connection with specific examples and applications thereof, other modifications thereof will appear to one skilled in the art without departing from the spirit and scope of the invention as defined in the appended claims.

What is claimed is:

1. A cathode comprising a structure of refractory metal forming an internal cavity, one wall of said structure being porous, the pores of said wall constituting the largest apertures connecting the cavity with an exterior electron-emissive surface of said cathode, a supply of alkaline earth compounds in said cavity consisting of a compound formed of an alkaline earth oxide and an acid-forming oxide, the amount of alkaline earth oxide not being in excess of the amount required to form a definite chemical compound with the acid-forming oxide, and a non-oxidic inorganic material selected from the group consisting of boron, boron carbide, silicon carbide, a metal carbide, and a metal boride disposed in reactive relationship with the said alkaline earth compounds and capable of reacting therewith in a manner principally productive of free alkaline earth metal.

2. A cathode comprising a structure of refractory metal forming an internal cavity, one wall of said structure being porous, the pores of said wall constituting the largest apertures connecting the cavity with an exterior electron-emissive surface of said cathode, a supply of alkaline earth compounds in said cavity consisting of a compound formed of an alkaline earth oxide and an acid-forming oxide, the amount of alkaline earth oxide not being in excess of the amount required to form a definite chemical compound with the acid-forming oxide, and granules of a non-oxidic inorganic material selected from the group consisting of boron, boron carbide, silicon carbide, a metal carbide, and a metal boride dispersed in said alkaline earth compounds and capable of reacting therewith in a manner principally productive of free alkaline earth metal.

3. A cathode comprising a structure of refractory metal forming an internal cavity, one wall of said structure being porous, the pores of said wall constituting the largest apertures connecting the cavity with an exterior electron-emissive surface of said cathode, a supply of alkaline earth compounds having a melting point higher than the maximum operating temperature of the cathode in said cavity and consisting of a compound formed of an alkaline earth oxide and an acid-forming oxide, the amount of alkaline earth oxide not being in excess of the amount required to form a definite chemical compound with the acid-froming oxide, and a non-oxidic inorganic material selected from the group consisting of boron, boron-carbide, silicon carbide, a metal carbide and a metal boride disposed in reactive relationship with said alkaline earth compounds and capable of reacting therewith in a manner principally productive of free alkaline earth metal.

4. A cathode comprising a structure of refractory metal forming a first internal cavity, one wall of said structure being porous, the pores of said wall constituting the largest apertures connecting the first cavity with an exterior electron-emissive surface of said cathode, a supply of alkaline earth compounds in said cavity consisting of a compound formed of an alkaline earth oxide and an acid-forming oxide, the amount required to form a definite chemical compound with alkaline earth oxide not being in excess of the amount of the acid-forming oxide, and a non-oxidic inorganic material selected from the group consisting of boron, boron-carbide, silicon carbide, a metal boride and a metal carbide disposed in a second cavity separated from said first cavity by a porous wall and capable of reacting with the alkaline earth compound in a manner principally productive of free alkaline earth metal.

5. A cathode comprising a structure of refractory metal forming an internal cavity, one wall of said structure being porous, the pores of said wall constituting the largest apertures connecting the cavity with an exterior electron-emissive surface of said cathode, a supply of alkaline earth compounds in said cavity consisting of a compound formed of an alkaline earth oxide and an acid-forming oxide, the amount of the alkaline earth oxide not being in excess of the amount required to form a definite chemical compound with the acid-forming oxide, and a metal boride disposed in reactive relationship with said alkaline earth compounds.

6. A cathode as claimed in claim 5 in which the alkaline earth compound is barium berylliate.

7. A cathode as claimed in claim 6 in which the metal boride is barium boride.

8. A cathode as claimed in claim 7 in which the barium boride is separated from the barium berylliate by a porous refractory metal wall.

9. A cathode comprising a structure of refractory metal forming an internal cavity, one wall of said structure being porous, the pores of said wall constituting the largest apertures connecting the cavity with an exterior electron-emissive surface of said cathode, a supply of alkaline earth compounds in said cavity consisting of a compound formed of an alkaline earth oxide and an oxide selected from the group consisting of BeO, ZnO, $Al_2O_3$, $TiO_2$, $ZrO_2$ and $SiO_2$, the amount of alkaline earth oxide not being in excess of the amount required to form a definite chemical compound with the latter oxide and a non-oxidic inorganic material selected from the group consisting of boron, boron-carbide, silicon carbide, a metal boride, and a metal carbide disposed in reactive relationship with said alkaline earth compounds and capable of reacting therewith in a manner principally productive of free alkaline earth metal.

10. A cathode comprising a structure of refractory metal forming an internal cavity, one wall of said structure being porous, the pores of said wall constituting the largest apertures connecting the cavity with an exterior electron-emissive surface of said cathode, a supply of alkaline earth compounds in said cavity consisting of a compound formed of an alkaline earth oxide and an acid-forming oxide, the amount of alkaline earth oxide not being in excess of the amount required to form a definite chemical compound with the acid-forming oxide, and a non-oxidic additive consisting of a metal carbide disposed in reactive relationship with said alkaline earth compounds and capable of reacting therewith in a manner principally productive of free alkaline earth metal.

11. A cathode comprising a structure of refractory metal forming an internal cavity, one wall of said structure being porous, the pores of said wall constituting the largest apertures connecting the cavity with an exterior electron-emissive surface of said cathode, a supply of alkaline earth compounds in said cavity consisting of a compound formed of an alkaline earth oxide and an acid-forming oxide, the amount of alkaline earth oxide not being in excess of the amount required to form a definite chemical compound with the acid-forming oxide, and boron disposed in reactive relationship with said alkaline earth compounds and capable of reacting therewith in a manner principally productive of free alkaline earth metal.

12. A cathode comprising a structure of refractory metal forming an internal cavity, one wall of said structure being porous, the pores of said wall constituting the largest apertures connecting the cavity with an exterior electron-emissive surface of said cathode, a supply of alkaline earth compounds in said cavity consisting of a compound formed of an alkaline earth oxide and an acid-forming oxide, the amount of alkaline earth oxide not being in excess of the amount required to form a definite chemical compound with the acid-forming oxide, and boron carbide disposed in reactive relationship with said alkaline earth compounds and capable of reacting therewith in a manner principally productive of free alkaline earth metal.

13. A cathode comprising a structure of refractory metal forming an internal cavity, one wall of said structure being porous, the pores of said wall constituting the largest apertures connecting the cavity with an exterior electron-emissive surface of said cathode, a supply of alkaline earth compounds in said cavity consisting of a compound formed of an alkaline earth oxide and an acid-forming oxide, the amount of alkaline earth oxide not being in excess of the amount required to form a definite chemical compound with the acid-forming oxide, and silicon carbide disposed in reactive relationship with said alkaline earth compounds and capable of reacting herewith in a manner principally productive of free alkaline earth metal.

References Cited in the file of this patent

UNITED STATES PATENTS

| | | |
|---|---|---|
| 1,922,244 | Hunter | Aug. 15, 1933 |
| 2,085,605 | Ramsay et al. | June 29, 1937 |
| 2,107,945 | Hull et al. | Feb. 8, 1938 |
| 2,416,661 | Lawton | Feb. 25, 1947 |
| 2,499,192 | Lafferty | Feb. 28, 1950 |
| 2,543,728 | Lemmens et al. | Feb. 27, 1951 |
| 2,700,118 | Hughes et al. | Jan. 18, 1955 |
| 2,716,716 | Hughes | Aug. 30, 1955 |

FOREIGN PATENTS

| | | |
|---|---|---|
| 624,009 | Great Britain | May 26, 1949 |
| 731,454 | Great Britain | June 8, 1955 |